United States Patent
Nozoe et al.

(10) Patent No.: US 11,251,422 B2
(45) Date of Patent: Feb. 15, 2022

(54) METHOD OF PRODUCING POSITIVE ELECTRODE MATERIAL FOR LITHIUM-ION SECONDARY BATTERIES, POSITIVE ELECTRODE MATERIAL FOR LITHIUM-ION SECONDARY BATTERIES, POSITIVE ELECTRODE FOR LITHIUM-ION SECONDARY BATTERIES, AND LITHIUM-ION SECONDARY BATTERY

(71) Applicant: SUMITOMO OSAKA CEMENT CO., LTD., Tokyo (JP)

(72) Inventors: Tsutomu Nozoe, Funabashi (JP); Ryuuta Yamaya, Narashino (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 127 days.

(21) Appl. No.: 16/544,704

(22) Filed: Aug. 19, 2019

(65) Prior Publication Data

US 2020/0067082 A1    Feb. 27, 2020

(30) Foreign Application Priority Data

Aug. 23, 2018 (JP) .............................. JP2018-156643

(51) Int. Cl.
| | |
|---|---|
| *H01M 10/0525* | (2010.01) |
| *H01M 4/133* | (2010.01) |
| *H01M 4/139* | (2010.01) |
| *H01M 4/36* | (2006.01) |
| *H01M 4/136* | (2010.01) |
| *H01M 4/587* | (2010.01) |
| *H01M 4/58* | (2010.01) |
| *H01M 4/02* | (2006.01) |

(52) U.S. Cl.
CPC ........... *H01M 4/366* (2013.01); *H01M 4/133* (2013.01); *H01M 4/136* (2013.01); *H01M 4/587* (2013.01); *H01M 4/5825* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2014/0004473 | A1* | 1/2014 | Song | F27B 7/08 432/11 |
| 2016/0049657 | A1* | 2/2016 | Forbert | C01B 25/45 429/221 |

FOREIGN PATENT DOCUMENTS

| | | |
|---|---|---|
| JP | 2012-530672 A | 12/2012 |
| JP | 5710788 B2 | 4/2015 |
| JP | 6128181 B2 | 5/2017 |
| JP | 2018-037291 A | 3/2018 |
| WO | 2010/149681 A | 12/2010 |

OTHER PUBLICATIONS

Office Action for Japanese Patent Application No. 2018-156643, dated Sep. 17, 2019.

* cited by examiner

*Primary Examiner* — Yoshitoshi Takeuchi
(74) *Attorney, Agent, or Firm* — Merchant & Gould P.C.

(57) ABSTRACT

A method of producing a positive electrode material for lithium-ion secondary batteries, which includes a pyrolyzed carbon coating, the method including a heat treatment step of thermally decomposing an organic compound using a rotary kiln to form a pyrolyzed carbon coating, wherein the organic compound is a carbon source that forms the pyrolyzed carbon coating of a positive electrode material.

8 Claims, No Drawings

METHOD OF PRODUCING POSITIVE ELECTRODE MATERIAL FOR LITHIUM-ION SECONDARY BATTERIES, POSITIVE ELECTRODE MATERIAL FOR LITHIUM-ION SECONDARY BATTERIES, POSITIVE ELECTRODE FOR LITHIUM-ION SECONDARY BATTERIES, AND LITHIUM-ION SECONDARY BATTERY

TECHNICAL FIELD

The present invention relates to a method of producing a positive electrode material for lithium-ion secondary batteries, a positive electrode material for lithium-ion secondary batteries, a positive electrode for lithium-ion secondary batteries, and a lithium-ion secondary battery.

BACKGROUND ART

A lithium-ion secondary battery that is a non-aqueous electrolyte secondary battery can achieve a reduction in size and weight and an increase in capacity and further has excellent properties such as high output and high energy density. Therefore, a lithium-ion secondary battery has been commercialized not only in an electric vehicle but also as a high-output power supply such as an electric tool. As an electrode material for lithium ion secondary batteries, for example, a material including a granulated body formed of primary particles is known, the primary particles including an electrode active material and a carbon coating that coats a surface of the electrode active material.

As a method of producing a positive electrode material for lithium-ion secondary batteries, for example, there is known a method including: a step of feeding electrode material particles including carbon into an upper portion of a kiln main body of a rotary kiln; and a step of calcinating the electrode material particles while moving the electrode material particles from the upper portion to a lower portion of the kiln main body (for example, refer to Patent Document 1).

In addition, as a method of producing a positive electrode material for lithium-ion secondary batteries, for example, there is known a method including: a step of preparing a mixture by adding an organic compound as a conductive carbon coating source to an electrode active material; and a step of putting the mixture into a calcination capsule and calcinating the mixture at a calcination temperature of 630° C. or higher and 790° C. or lower (for example refer to Patent Document 2).

RELATED ART DOCUMENT

Patent Documents

Patent Document 1: Japanese Patent No. 5710788
Patent Document 2: Japanese Patent No. 6128181

DISCLOSURE OF THE INVENTION

Problem to be Solved by the Invention

In a method of laying a granulated body, that is formed of a mixture including an electrode active material and an organic compound as a carbon coating source, in a container of the related art such as a roller hearth kiln or a tube furnace and calcinating the granulated body, unevenness in the thickness of a carbon coating occurs during the calcination due to temperature unevenness and unevenness in the amount of the organic component volatilized. With respect to the calcination in the tube furnace or the roller hearth kiln, a calcination method of putting a thermal conduction auxiliary material into the container is also known. However, in this method, although the temperature unevenness in the granulated body can be reduced, and unevenness in the thickness of a carbon coating occurs due to a difference in the degree of contact between the volatilized organic component and the electrode active material.

In addition, a method of calcinating an electrode active material and a carbon source using a rotary kiln for uniform calcination is studied.

However, when a mixture of primary particles, an agglomerate of an electrode active material and a carbon source is calcinated as it is using a rotary kiln, adherence to an inner wall surface of the rotary kiln occurs due to low fluidity of the agglomerate. Since the primary particles agglomerate and are in contact with each other, sintering is likely to occur for them, and therefore, sintering between the primary particles is likely to progress. Accordingly, there is a problem in that, for example, fine powder formation is likely to occur during calcination due to low adhesiveness between the primary particles. When the powder adheres to the inner wall surface, uniform calcination is not performed, and problems such as unevenness in the thickness of a carbon coating of the recovered powder are caused. The sintering between the primary particles causes the deterioration of battery characteristics due to a decrease in surface area, and the fine powder formation causes deterioration in handling properties.

The present invention has been made in consideration of the above-described circumstances, and an object thereof is to provide a method of producing a positive electrode material for lithium-ion secondary batteries, a positive electrode material for lithium-ion secondary batteries, a positive electrode for lithium-ion secondary batteries, and a lithium-ion secondary battery, in which adherence of a positive electrode active material to an inner wall surface of a rotary kiln, sintering between primary particles, fine powder formation, and the like can be prevented.

Means for Solving the Problem

In order to achieve the object, the present inventors conducted a thorough investigation and found that adherence of a positive electrode active material to an inner wall surface of a rotary kiln, sintering between primary particles, fine powder formation, and the like can be prevented with a method of producing a positive electrode material for lithium-ion secondary batteries including a pyrolyzed carbon coating, the method including: a heat treatment step of thermally decomposing an organic compound using a rotary kiln, the organic compound being a carbon source that forms the pyrolyzed carbon coating, thereby completing the present invention.

A method of producing a positive electrode material for lithium-ion secondary batteries according to the present invention is a method of producing a positive electrode material for lithium-ion secondary batteries which includes a pyrolyzed carbon coating, the method including a heat treatment step of thermally decomposing an organic compound using a rotary kiln to form a pyrolyzed carbon coating of a positive electrode material, wherein the organic compound is a carbon source that forms the pyrolyzed carbon coating.

The aforementioned method preferably include, before the heat treatment step, a step of forming a mixture which includes an organic compound as a carbon source, a positive electrode active material and a dispersion medium, and a drying step of drying the mixture to obtain a granulated body which includes the organic compound and the positive electrode active material, and wherein the organic compound included in the granulated body generated in the drying step is thermally decomposed in the heat treatment step to generate the pyrolyzed carbon coating of the electrode material.

A positive electrode material for lithium-ion secondary batteries according to the present invention is a positive electrode material for lithium-ion secondary batteries, wherein the positive electrode material is produced by the method of producing a positive electrode material for lithium-ion secondary batteries according to the present invention, the positive electrode material including: the positive electrode active material; and the pyrolyzed carbon coating that coats a surface of the positive electrode active material, wherein a sphericity of the positive electrode material is 0.8 or higher.

A positive electrode for lithium-ion secondary batteries according to the present invention is a positive electrode for lithium-ion secondary batteries, wherein the positive electrode including: an electrode current collector; and a positive electrode mixture layer that is formed on the electrode current collector, wherein the positive electrode mixture layer includes the aforementioned positive electrode material for lithium-ion secondary batteries.

A lithium-ion secondary battery according to the present invention is a lithium-ion secondary battery including: a positive electrode; a negative electrode; and a non-aqueous electrolyte, wherein the positive electrode is the positive electrode for lithium-ion secondary batteries according to the present invention.

Effects of the Invention

In the method of producing a positive electrode material for lithium-ion secondary batteries according to the present invention, adherence of a positive electrode active material to an inner wall surface of a rotary kiln, sintering between primary particles, fine powder formation, and the like can be prevented.

With the positive electrode material for lithium-ion secondary batteries according to the present invention, a lithium-ion secondary battery can be realized in which the discharge capacity is high and the charge-discharge direct current resistance is low.

The positive electrode for lithium-ion secondary batteries according to the present invention includes the positive electrode material for lithium-ion secondary batteries according to the present invention. Therefore, the positive electrode for lithium-ion secondary batteries having no unevenness in composition can be produced.

The lithium-ion secondary battery according to the present invention includes the positive electrode for lithium-ion secondary batteries according to the present invention. Therefore, the lithium-ion secondary battery can be provided in which the discharge capacity is high and the charge-discharge direct current resistance is low.

BEST MODE FOR CARRYING OUT THE INVENTION

An embodiment of a method of producing a positive electrode material for lithium-ion secondary batteries, a positive electrode material for lithium-ion secondary batteries, a positive electrode for lithium-ion secondary batteries, and a lithium-ion secondary battery according to the present invention will be described.

The embodiment will be described in detail for easy understanding of the concept of the present invention, but the present invention is not limited thereto unless specified otherwise.

[Method of Producing Positive Electrode Material for Lithium-Ion Secondary Batteries]

The method of producing a positive electrode material for lithium-ion secondary batteries according to the embodiment is a method of producing a positive electrode material for lithium-ion secondary batteries including a pyrolyzed carbon coating (carbonaceous coating), the method including a heat treatment step of thermally decomposing an organic compound using a rotary kiln, the organic compound being a carbon source that forms the pyrolyzed carbon coating.

It is preferable that the method of producing a positive electrode material for lithium-ion secondary batteries according to the embodiment includes: a step of performing dispersion treatment of a first mixture (mixed liquid) which includes a positive electrode active material and a dispersion medium to prepare a dispersion (dispersion liquid) wherein a span value of a particle diameter distribution of the positive electrode active material is 0.5 or higher and 1.0 or lower; a step of forming a second mixture (mixed liquid) which includes the dispersion and an organic compound which is a carbon source, and drying the second mixture to obtain a granulated body having a sphericity of 0.8 or higher; and the heat treatment step wherein the granulated body is calcinated (baked) to thermally decompose the organic compound and obtain a positive electrode material for lithium-ion secondary batteries wherein a sphericity of the electrode material is 0.8 or more and a surface of the positive electrode active material is coated with the pyrolyzed carbon coating.

In the method of producing a positive electrode material for lithium-ion secondary batteries according to the embodiment, it is preferable that the obtained positive electrode material for lithium-ion secondary batteries includes an olivine positive electrode active material. That is, in the method of producing a positive electrode material for lithium-ion secondary batteries according to the embodiment, it is preferable that an olivine positive electrode active material is used as the positive electrode active material.

Examples of the olivine positive electrode active material include a compound represented by Formula $Li_xA_yD_zPO_4$ (where A represents at least one selected from the group consisting of Co, Mn, Ni, Fe, Cu, and Cr, D represents at least one selected from the group consisting of Mg, Ca, Sr, Ba, Ti, Zn, B, Al, Ga, In, Si, Ge, Sc, Y, and rare earth elements, $0.9<x<1.1$, $0<y\leq 1$, $0\leq z<1$, and $0.9<y+z<1.1$).

Particles formed of the compound represented by $Li_xA_yD_zPO_4$ (hereinafter, referred to as "$Li_xA_yD_zPO_4$ particles") are produced as follows.

For example, it is preferable that the $Li_xA_yD_zPO_4$ particles are obtained by feeding a Li source, an A source, a D source, and a $PO_4$ source into water such that a molar ratio $x:y+z$ thereof is 1:1, stirring the components to obtain a $Li_xA_yD_zPO_4$ precursor solution, putting this precursor solution into a pressure-resistant container, and performing a hydrothermal treatment at a high temperature and a high pressure, for example, at 120° C. to 250° C. and 0.2 MPa for 1 hour to 24 hours.

In this case, by adjusting the temperature, the pressure, and the time during the hydrothermal treatment, the particle diameter of the $Li_xA_yD_zPO_4$ particles can be controlled to be a desired diameter.

In this case, as the Li source, for example, at least one selected from the group consisting of a lithium inorganic acid salt such as lithium hydroxide (LiOH), lithium carbonate ($Li_2CO_3$), lithium chloride (LiCl), or Lithium phosphate ($Li_3PO_4$) and a lithium organic acid salt such as lithium acetate ($LiCH_3COO$) or lithium oxalate ($(COOLi)_2$).

Among these, lithium chloride or lithium acetate is preferable from the viewpoint of obtaining a uniform solution phase.

Here, as the A source, at least one selected from the group consisting of a Co source formed of a cobalt compound, a Mn source formed of a manganese compound, a Ni source formed of a nickel compound, a Fe source formed of an iron compound, a Cu source formed of a copper compound, and a Cr source formed of a chromium compound is preferable. In addition, as the D source, at least one selected from the group consisting of a Mg source formed of a magnesium compound, a Ca source formed of a calcium compound, a Sr source formed of a strontium compound, a Ba source formed of a barium compound, a Ti source formed of a titanium compound, a Zn source formed of a zinc compound, a B source formed of a boron compound, an Al source formed of an aluminum compound, a Ga source formed of a gallium compound, an In source formed of an indium compound, a Si source formed of a silicon compound, a Ge source formed of a germanium compound, a Sc source formed of a scandium compound, and a Y source formed of a yttrium compound is preferable.

As the Co source, a Co salt is preferable. For example, at least one selected from the group consisting of cobalt (II) chloride ($CoCl_2$), cobalt (II) sulfate ($CoSO_4$), cobalt (II) nitrate ($Co(NO_3)_2)_2$, cobalt (II) acetate ($Co(CH_3COO)_2$), and hydrates thereof is preferably used.

As the Mn source, a Mn salt is preferable. For example, at least one selected from the group consisting of manganese (II) chloride ($MnCl_2$), manganese (II) sulfate ($MnSO_4$), manganese (II) nitrate ($Mn(NO_3)_2$), manganese (II) acetate ($Mn(CH_3COO)_2$), and hydrates thereof is preferably used. Among these, manganese sulfate is preferable from the viewpoint of obtaining a uniform solution phase.

As the Ni source, a Ni salt is preferable. For example, at least one selected from the group consisting of nickel (II) chloride ($NiCl_2$), nickel (II) sulfate ($NiSO_4$), nickel (II) nitrate ($Ni(NO_3)_2$), nickel (II) acetate ($Ni(CH_3COO)_2$), and hydrates thereof is preferable.

As the Fe source, for example, a divalent iron compound or a hydrate thereof such as iron (II) chloride ($FeCl_2$), iron (II) sulfate ($FeSO_4$), or iron (II) acetate ($Fe(CH_3COO)_2$), a trivalent iron compound such as iron (III) nitrate ($Fe(NO_3)_3$), iron (III) chloride ($FeCl_3$), or iron (III) citrate ($FeC_6H_5O_7$), or lithium iron phosphate is used.

As the Cu source, for example, at least one selected from the group consisting of copper (II) chloride ($CuCl_2$), copper (II) sulfate ($CuSO_4$), copper (II) nitrate ($Cu(NO_3)_2$), copper (II) acetate ($Cu_2(CH_3COO)_4$), and hydrates thereof is preferable.

As the Cr source, for example, at least one selected from the group consisting of chromium (II) chloride ($CrCl_2$), chromium (III) sulfate ($Cr_2(SO_4)_3$), chromium (II) nitrate ($Cr(NO_3)_3$), chromium (II) acetate ($Cr_2(CH_3COO)_4$), and hydrates thereof is preferable.

As the Mg source, for example, at least one selected from the group consisting of magnesium (II) chloride ($MgCl_2$), magnesium (II) sulfate ($MgSO_4$), magnesium (II) nitrate ($Mg(NO_3)_2$), magnesium (II) acetate ($Mg(CH_3COO)_2$), and hydrates thereof is preferable.

As the Ca source, for example, at least one selected from the group consisting of calcium (II) chloride ($CaCl_2$), calcium (II) sulfate ($CaSO_4$), calcium (II) nitrate ($Ca(NO_3)_2$), calcium (II) acetate ($Ca(CH_3COO)_2$), and hydrates thereof is preferable.

As the Sr source, for example, at least one selected from the group consisting of strontium carbonate ($SrCO_3$), strontium sulfate ($SrSO_4$), and strontium hydroxide ($Sr(OH)_2$) is preferable.

As the Ba source, for example, at least one selected from the group consisting of barium (II) chloride ($BaCl_2$), barium (II) sulfate ($BaSO_4$), barium (II) nitrate ($Ba(NO_3)_2$), barium (II) acetate ($Ba(CH_3COO)_2$), and hydrates thereof is preferable.

As the Ti source, for example, at least one selected from the group consisting of titanium chlorides ($TiCl_4$, $TiCl_3$, and $TiCl_2$), titanium oxide (TiO), and hydrates thereof is preferable.

As the Zn source, a Zn salt is preferable. For example, at least one selected from the group consisting of zinc (II) chloride ($ZnCl_2$), zinc (II) sulfate ($ZnSO_4$), zinc (II) nitrate ($Zn(NO_3)_2$), zinc (II) acetate ($Zn(CH_3COO)_2$), and hydrates thereof is preferable.

As the B source, for example, at least one selected from the group consisting of boron compounds of chlorides, sulfates, nitrates, acetates, hydroxides, oxides, and the like is preferable.

As the Al source, for example, at least one selected from the group consisting of aluminum compounds of chlorides, sulfates, nitrates, acetates, hydroxides, and the like is preferable.

As the Ga source, for example, at least one selected from the group consisting of gallium compounds of chlorides, sulfates, nitrates, acetates, hydroxides, and the like is preferable.

As the In source, for example, at least one selected from the group consisting of indium compounds of chlorides, sulfates, nitrates, acetates, hydroxides, and the like is preferable.

As the Si source, for example, at least one selected from the group consisting of sodium silicate, potassium silicate, silicon tetrachloride ($SiCl_4$), silicates, and organic silicon compounds is preferable.

As the Ge source, for example, at least one selected from the group consisting of germanium compounds of chlorides, sulfates, nitrates, acetates, hydroxides, oxides, and the like is preferable.

As the Sc source, for example, at least one selected from the group consisting of scandium compounds of chlorides, sulfates, nitrates, acetates, hydroxides, oxides, and the like is preferable.

As the Y source, for example, at least one selected from the group consisting of yttrium compounds of chlorides, sulfates, nitrates, acetates, hydroxides, oxides, and the like is preferable.

As the $PO_4$ source, for example, at least one selected from the group consisting of yellow phosphorus, red phosphorus, phosphoric acids such as orthophosphoric acid ($H_3PO_4$) or metaphosphoric acid ($HPO_3$), ammonium dihydrogen phosphate ($NH_4H_2PO_4$), diammonium hydrogen phosphate ($(NH_4)_2HPO_4$), ammonium phosphate ($(NH_4)_3PO_4$), lithium phosphate ($Li_3PO_4$), dilithium hydrogen phosphate ($Li_2HPO_4$), lithium dihydrogen phosphate ($LiH_2PO_4$), and hydrates thereof is preferable.

In particular, orthophosphoric acid is preferable from the viewpoint of easily forming a uniform solution phase.

Next, the positive electrode active material (for example, the $Li_xA_yD_zPO_4$ particles) and a dispersion medium are mixed with each other to form a mixture, and this mixture is dispersed to prepare a dispersion liquid in which a span value of a particle diameter distribution of the positive electrode active material is 0.5 or higher and 1.0 or lower (step of preparing the dispersion liquid).

The span value of the particle diameter distribution of the positive electrode active material in the dispersion liquid is preferably 0.5 or higher and 3.0 or lower, more preferably 0.6 or higher and 2.0 or lower, and still more preferably 0.7 or higher and 1.0 or lower.

When the span value of the particle diameter distribution of the positive electrode active material in the dispersion liquid is lower than 0.5, the porosity increases and the energy density decreases due to a small difference in particle diameter in the granulated body. On the other hand, when the span value of the particle diameter distribution of the positive electrode active material in the dispersion liquid is higher than 3.0, agglomerated particles remain in the granulated body, sintering occurs during calcination, and the electrical capacity decrease due to a decrease in surface area.

The span value of the particle diameter distribution of the positive electrode active material in the dispersion liquid refers to a value which can be obtained, by calculation, from the following expression using a particle diameter (D90) which is obtained at a cumulative volume percent of 90 vol %, a particle diameter (D50) which is obtained at a cumulative volume percent of 50 vol %, and a particle diameter (D10) which is obtained a cumulative volume percent of 10 vol %, wherein the diameters are obtained from the volume particle diameter distribution of the positive electrode active material.

Span Value=$(D90-D10)/D50$

The span value can be obtained by evaluating the dispersed mixture which includes the positive electrode active material and the dispersion medium.

The volume particle diameter distribution of the positive electrode active material is measured using a method according to JIS Z 8825 "Particle Size Analysis—Laser Diffraction Methods—".

A method of dispersing the mixture of the positive electrode active material and the mixture is not particularly limited, and it is preferable that a device that can release the agglomerated state of the positive electrode active material, can uniformly disperse the positive electrode active material in the dispersion medium, and can impart dispersion energy such that the span value of the particle diameter distribution of the positive electrode active material in the dispersion liquid is 0.5 or higher and 3.0 or lower is preferable. Examples of the device include a stirrer, a bead mill using zirconia beads, a ball mill, a homogenizer, an ultrasonic disperser, a kneader, a triple roll mill, and a planetary centrifugal mixer. In particular, when a continuous bead mill is used as the disperser, the liquid can be sampled during the dispersion. Therefore, the time at which the span value enters the predetermined range can be set as an end point, and the span value can be easily adjusted.

The time required for the dispersion treatment is not particularly limited as long as it is sufficient for uniformly dispersing the positive electrode active material in the dispersion medium.

A mixing ratio (mass ratio; positive electrode active material/dispersion medium) between the positive electrode active material and the dispersion medium is preferably 1/9 to 7/3 and more preferably 2/8 to 6/4.

The dispersion medium is not particularly limited as long as the positive electrode active material can be uniformly dispersed therein. For example, a solvent including water as a major component is preferable.

The solvent including water as a major component may be either water alone or optionally an aqueous solvent including an aqueous solvent such as alcohol.

The aqueous solvent is not particularly limited as long as a lithium salt, a metal salt including Fe, a metal salt including Mn, a metal salt including M, and a phosphate compound are soluble therein. Examples of the aqueous solvent include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetyl acetone, and cyclohexanone; amides such as dimethylformamide, N,N-dimethylacetoacetamide, and N-methylpyrrolidone; and glycols such as ethylene glycol, diethylene glycol, and propylene glycol. Among these solvents, one kind may be used alone, or a mixture of two or more kinds may be used.

Next, the above-described dispersion liquid and an organic compound as a carbon source are mixed with each other to prepare a mixture (slurry), and this mixture is dried to obtain a granulated body having a sphericity of 0.8 or higher (step of preparing the granulated body).

A method of mixing the dispersion liquid and the organic compound is not particularly limited, and it is preferable that a device that can uniformly mix the dispersion liquid and the organic compound is used. Examples of the device include a stirrer, a bead mill using zirconia beads, a ball mill, a homogenizer, an ultrasonic disperser, a kneader, a triple roll mill, and a planetary centrifugal mixer.

The time required for the mixing treatment is not particularly limited as long as it is sufficient for uniformly mixing the dispersion liquid and the organic compound.

After mixing, the carbon content in the organic compound is preferably 2 parts by mass or more and 20 parts by mass or less and more preferably 4 parts by mass or more and 10 parts by mass or less with respect to 100 parts by mass of the positive electrode active material.

Examples of the organic compound include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether, and polyols.

Examples of the polyols include polyethylene glycol, polypropylene glycol, polyglycerin, and glycerin.

The mixture of the dispersion liquid and the organic compound is dried to obtain a granulated body having a sphericity of 0.8 or higher. A drying method is not particularly limited as long as the dispersion medium can be removed from the mixture. When agglomerated particles are prepared, the granulated body may be dried with a spray drying method using a spray dryer. For example, a method of spraying the mixture in a high temperature atmosphere at 50° C. or higher and 300° C. or lower to obtain a particulate dry material or a granular dry material can be used.

The sphericity of the granulated body refers to a value obtained by dividing the same circumferential length of a circle having the same area as the projected area of a particle image by the peripheral length of the particle image. When the granulated body has a true circle, the sphericity is 1, and as the shape of the granulated body deviates from a circle shape, the sphericity decreases.

The sphericity of the granulated body is calculated by measuring the areas and peripheral lengths of 100 particles in a scanning electron microscope image by image analysis and obtaining the average sphericity of the respective granulated bodies.

Next, the granulated body is calcinated (heat treatment) using a rotary kiln, and the organic compound as a carbon source that forms a pyrolyzed carbon coating is thermally decomposed (heat treatment step) to obtain a positive electrode material for lithium-ion secondary batteries in which a sphericity is 0.8 or higher and a surface of the positive electrode active material is coated with a pyrolyzed carbon coating.

For example, the rotary kiln includes: a heat treatment portion that includes a cylindrical kiln main body; a feeding portion for feeding the granulated body (material to be treated) into the kiln main body; and a discharge portion for discharging the granulated body from the kiln main body.

Examples of a method of calcinating the granulated body using a rotary kiln include the following method. The granulated body is fed into an upper portion of the kiln main body, the granulated body is calcinated while causing positive pressure gas to flow through the inside of the kiln main body and moving the granulated body from the upper portion to a lower portion of the kiln main body, and the calcinated granulated body is discharged from the lower portion of the kiln main body. The granulated body discharged from the lower portion of the kiln main body is cooled by causing the granulated body to pass through a cooler.

A method of feeding the granulated body into the rotary kiln is not particularly limited, and the feeding method varies depending on the angle of repose of the granulated body. When the angle of repose of the granulated body is large, the granulated body cannot be smoothly fed into the kiln main body due to a bridge phenomenon between the granulated body and a feeding device in the feeding portion of the rotary kiln. The type of the feeding device is not particularly limited, and examples thereof include a screw type, a vibration type, a push type, and a pneumatic conveying type.

The calcination temperature of the granulated body in the kiln main body is preferably 400° C. or higher and 1000° C. or lower and more preferably 600° C. or higher and 800° C. or lower.

It is not preferable that the calcination temperature is lower than 400° C. because the decomposition reaction of the organic compound included in the granulated body do not sufficiently progress, the carbonization of the organic compound is insufficient, and the produced decomposition reaction product is a high-resistance organic decomposition product. On the other hand, it is not preferable that the calcination temperature is higher than 1000° C. because a component constituting the granulated body, for example, lithium (Li) is evaporated such that the composition deviates, particle growth in the granulated body is promoted, the discharge capacity in the high charge-discharge rate decreases, and it is difficult to realize sufficient charge and discharge rate performance.

The time (calcination time) for which the granulated body remains in the kiln main body is preferably 0.5 hours or longer and 6 hours or shorter and more preferably 0.5 hours or longer and 2 hours or shorter. When the calcination time is 0.5 hours or longer, the granulated body is sufficiently calcinated, and the time for which the granulated body is in contact with the positive pressure gas is long. Therefore, the crystallinity of the granulated body is improved, and the content of an unreacted material and water decreases. When this granulated body is used as a positive electrode material, the tap density of a positive electrode mixture layer increases, and the binding strength between the positive electrode mixture layer and an electrode current collector is improved.

The kiln main body is arranged in an inclined state, and the granulated body is calcinated while conveying the granulated body from the upper portion (top portion side, upstream side) to the lower portion (bottom portion side, downstream side). In addition, the positive pressure (pressure higher than the atmospheric pressure) gas is supplied to the kiln main body. It is preferable that the positive pressure gas in the kiln main body has a high pressure which is 0.01 kPa to 1 kPa higher than atmospheric pressure.

When the pressure in the kiln main body is lower than the atmospheric pressure, outside air including impurities such as water or oxygen flows into the kiln main body. When the granulated body that is calcinated in an environment where the water content is high is used as the positive electrode material, the binding strength between the positive electrode mixture layer and the electrode current collector deteriorates. In addition, oxygen oxidizes the positive electrode material such that electrochemical characteristics deteriorate, and oxidizes the kiln main body such that durability deteriorates. On the other hand, it is not preferable that the pressure in the kiln main body is excessively high from the viewpoint of safety.

The positive pressure gas supplied to the kiln main body is exhausted through an upper positive pressure gas outlet provided in an upper portion (top portion side) of the heat treatment portion or a lower positive pressure gas outlet provided in a lower portion (bottom portion side) of the heat treatment portion. Here, the upper side of the heat treatment portion refers to the side (upper portion) where the feeding portion of the material to be treated is present with respect to the center of the heat treatment portion in a longitudinal direction, and the lower side of the heat treatment portion refers to the side (lower portion) where the discharge portion of the material to be treated is present with respect to the center of the heat treatment portion in the longitudinal direction. From the viewpoint of removing water present in the kiln main body, it is advantageous that 50% or higher of the positive pressure gas with respect to the total amount of the positive pressure gas to be discharged is exhausted through the upper positive pressure gas outlet.

It is preferable that the positive pressure gas is caused to flow in a direction from the lower portion to the upper portion of the kiln main body. The positive pressure gas is supplied to the lower portion of the kiln main body and is exhausted from the upper portion of the kiln main body. From the viewpoint of collecting and removing fine carbon powder and other fine powders, it is advantageous that the positive pressure gas in the kiln main body is injected and exhausted so as to flow in a direction opposite to the flow of the material to be treated. The fine carbon powder may be included in the positive electrode active material or may be produced when the kiln main body formed of a carbon material is etched.

The positive pressure gas is at least one selected from the group consisting of nitrogen ($N_2$), carbon dioxide ($CO_2$), hydrogen ($H_2$), helium (He), neon (Ne), argon (Ar), krypton (Kr), xenon (Xe), and radon (Rn). As the positive pressure gas, a mixture of nitrogen and butane can also be used.

In the positive pressure gas, a gaseous carbon compound can also be mixed. In this case, there is an advantageous effect in that the surface of the positive electrode active material that is insufficiently coated with the pyrolyzed carbon coating can be improved. In addition, the gaseous carbon compound functions to prevent damages by the oxidation of the positive electrode active material and the oxidation of the kiln main body. Examples of the gaseous carbon compound include hydrocarbon gas such as methane, ethane, butane, or propane.

The oxygen concentration in the kiln main body is preferably 200 ppm or lower and more preferably 100 ppm or lower.

When the oxygen concentration in the kiln main body is 200 ppm or lower, there is a problem in that the positive electrode active material or the kiln main body is oxidized.

Examples of a material of the kiln main body include metal, ceramic, and carbon. In the process of calcinating the granulated body, the inner wall of the kiln main body that rubs the granulated body is worn such that fine powder is produced, and this fine powder is incorporated into the granulated body as impurities. Therefore, in order to prevent the incorporation of the fine powder, it is preferable that the inner surface of the kiln main body that comes into contact with the granulated body is formed of carbon.

The sphericity of the positive electrode material for lithium-ion secondary batteries refers to a value obtained by dividing the same circumferential length of a circle having the same area as the projected area of the positive electrode material by the peripheral length of the positive electrode material of the particle image. When the positive electrode material has a true circle, the sphericity is 1, and as the shape of the positive electrode material deviates from a circle shape, the sphericity decreases.

The sphericity of the positive electrode material for lithium-ion secondary batteries is measured using the same method as that of the sphericity of the granulated body.

In the method of producing a positive electrode material for lithium-ion secondary batteries according to the embodiment, by forming the granulated body including the positive electrode active material and the organic compound as a carbon source to maintain the fluidity of the granulated body, adherence of the positive electrode active material to the inner wall surface of the rotary kiln can be prevented, and the binding of primary particles including the positive electrode active material (primary particles) and the pyrolyzed carbon coating for coating the surface of the positive electrode active material can be prevented. As a result, sintering between the primary particles can be prevented, and the cracking of the granulated body can be prevented. In addition, by calcinating the granulated body using the rotary kiln, the granulated body is stirred due to the rotation of the rotary kiln and comes into uniform contact with an atmosphere. As a result, the homogenization of the granulated body can be achieved. Due to the homogenization of the granulated body, variation in characteristics caused by calcination unevenness depending on recovery positions that is a problem in a tube furnace can be reduced.

In addition, in the method of producing a positive electrode material for lithium-ion secondary batteries according to the embodiment, the mixture of the positive electrode active material and the dispersion medium is dispersed to prepare a dispersion liquid, and this dispersion liquid and the organic compound as a carbon source are mixed with each other to prepare a mixture (slurry). As a result, when this mixture is dried to form a granulated body, binding between the primary particles of the positive electrode active material caused by agglomeration can be prevented. In addition, since the organic compound functions as a binder, the granulated body is not likely to crack.

[Positive Electrode Material for Lithium-Ion Secondary Batteries]

The positive electrode material for lithium-ion secondary batteries according to the embodiment is a positive electrode material for lithium-ion secondary batteries that is produced using the method of producing a positive electrode material for lithium-ion secondary batteries according to the embodiment, the positive electrode material including: a positive electrode active material; and a pyrolyzed carbon coating that coats a surface of the positive electrode active material, in which a sphericity is 0.8 or higher.

It is preferable that the positive electrode material for lithium-ion secondary batteries according to the embodiment includes an olivine positive electrode active material. That is, in the positive electrode material for lithium-ion secondary batteries according to the embodiment, it is preferable that an olivine positive electrode active material is provided as the positive electrode active material.

The positive electrode material for lithium-ion secondary batteries according to the embodiment includes the granulated body formed of the primary particles including the positive electrode active material (primary particles) and the pyrolyzed carbon coating for coating the surface of the positive electrode active material. Hereinafter, the primary particles including the positive electrode active material (primary particles) and the pyrolyzed carbon coating for coating the surface of the positive electrode active material will also be referred to as "the primary particles of the carbon-coated positive electrode active material".

In the positive electrode material for lithium-ion secondary batteries according to the embodiment, the sphericity is preferably 0.8 or higher and more preferably 0.9 or higher.

When the sphericity of the positive electrode material for lithium-ion secondary batteries is 0.8 or higher, handling properties during the preparation of an electrode can be improved, and the electrode density can be improved.

In the positive electrode material for lithium-ion secondary batteries according to the embodiment, the average particle diameter of the primary particles of the carbon-coated positive electrode active material is 30 nm or more and 500 nm or less, preferably 50 nm or more and 400 nm or less, and more preferably 50 nm or more and 300 nm or less.

Here, the reason why the average particle diameter of the primary particles of the carbon-coated positive electrode active material is in the above-described range is as follows. When the average primary particle size is 30 nm or more, an increase in the amount of carbon caused by an excessive increase in specific surface area can be suppressed. On the other hand, when the average primary particle size is 500 nm or less, the electron conductivity and the ion diffusion performance can be improved due to a large specific surface area.

The average particle diameter of the primary particles of the carbon-coated positive electrode active material can be obtained by measuring the particle diameters of 200 or more any primary particles using a scanning electron microscope (SEM) and obtaining the number average value thereof.

In the positive electrode material for lithium-ion secondary batteries according to the embodiment, the average particle diameter of the granulated body formed of the primary particles of the carbon-coated positive electrode active material is 0.5 µm or more and 60 µm or less, preferably 1 µm or more and 20 µm or less, and more preferably 1 µm or more and 10 µm or less.

Here, the reason why the average particle diameter of the granulated body is in the above-described range is as follows. In a case where the average particle diameter of the granulated body is 0.5 µm or more, when the positive electrode material, a conductive auxiliary agent, a binder resin (binder), and a solvent are mixed with each other to prepare a positive electrode material paste for lithium-ion secondary batteries, the mixing amount of the conductive auxiliary agent and the binder can be reduced, and the battery capacity of the lithium-ion secondary battery per unit mass of the positive electrode mixture layer for lithium-ion secondary batteries can be increased. On the other hand, when the average particle diameter of the granulated body is 60 µm or less, the dispersibility and the uniformity of the conductive auxiliary agent or the binder included in the positive electrode mixture layer for lithium-ion secondary batteries can be improved. As a result, in the lithium-ion secondary battery in which the positive electrode material for lithium-ion secondary batteries according to the embodiment is used, the discharge capacity during high-speed charge and discharge can be increased.

The average particle diameter of the granulated body is measured using a laser diffraction particle diameter analyzer after suspending the positive electrode material for lithium-ion secondary batteries according to the embodiment in a dispersion medium in which 0.1% by mass of polyvinyl pyrrolidone is dissolved in water.

In the positive electrode material for lithium-ion secondary batteries according to the embodiment, the carbon content in the primary particles of the carbon-coated positive electrode active material is preferably 0.5% by mass or more and 2.5% by mass or less, preferably 0.8% by mass or more and 1.3% by mass or less, and still more preferably 0.8% by mass or more and 1.2% by mass or less.

Here, the reason why the carbon content in the primary particles of the carbon-coated positive electrode active material is in the above-described range is as follows. When the carbon content in the primary particles is 0.5% by mass or more, the electron conductivity can be sufficiently improved. On the other hand, when the carbon content in the primary particles of the carbon-coated positive electrode active material is 2.5% by mass or less, the electrode density can be improved.

The carbon content in the primary particles of the carbon-coated positive electrode active material is measured using a carbon analyzer (carbon-sulfur analyzer: EMIA-810W (trade name), manufactured by Horiba Ltd.).

In the positive electrode material for lithium-ion secondary batteries according to the embodiment, the coverage of the carbon coating in the primary particles of the carbon-coated positive electrode active material is preferably 80% or more, more preferably 85% or more, and still more preferably 90% or more. Here, the reason why the coverage of the carbon coating in the primary particles of the carbon-coated positive electrode active material is in the above-described range is as follows. When the coverage of the carbon coating in the primary particles of the carbon-coated positive electrode active material is 80% or more, the coating effect of the carbon coating can be sufficiently obtained.

The coverage of the carbon coating in the primary particles of the carbon-coated positive electrode active material is measured, for example, using a transmission electron microscope (TEM) or an energy dispersive X-ray microanalyzer (EDX).

In the positive electrode material for lithium-ion secondary batteries according to the embodiment, the thickness of the carbon coating in the primary particles of the carbon-coated positive electrode active material is preferably 0.8 nm or more and 5.0 nm or less, more preferably 0.9 nm or more and 4.5 nm or less, and still preferably 0.8 nm or more and 4.0 nm or less.

Here, the reason why the thickness of the carbon coating in the primary particles of the carbon-coated positive electrode active material is in the above-described range is as follows. When the thickness of the carbon coating in the primary particles is 0.8 nm or more, the thickness of the carbon coating is excessively thin, and thus a carbon coating having a desired resistance value can be formed. On the other hand, when the thickness of the carbon coating in the primary particles of the carbon-coated positive electrode active material is 5.0 nm or less, a decrease in the battery capacity per unit mass of the electrode material can be suppressed.

The thickness of the carbon coating in the primary particles of the carbon-coated positive electrode active material is measured, for example, using a transmission electron microscope (TEM) or an energy dispersive X-ray microanalyzer (EDX).

The positive electrode material for lithium-ion secondary batteries according to the embodiment may include a component other than the above-described granulated body. Examples of the component other than the granulated body include a binder formed of a binder resin and a conductive auxiliary agent such as carbon black, acetylene black, graphite, Ketjen black, natural graphite, or artificial graphite.

The specific surface area of the granulated body in the positive electrode material for lithium-ion secondary batteries according to the embodiment is preferably 6 $m^2/g$ or more and 30 $m^2/g$ or less and more preferably 10 $m^2/g$ or more and 20 $m^2/g$ or less.

Here, the reason why the specific surface area of the positive electrode material for lithium-ion secondary batteries according to the embodiment is limited to the above-described range is as follows. When the specific surface area is 6 $m^2/g$ or more, the diffusion rate of lithium ions in the positive electrode material can be increased, and the battery characteristics of the lithium-ion secondary battery can be improved. On the other hand, when the specific surface area is 30 $m^2/g$ or less, the electron conductivity can be improved.

The specific surface area of the positive electrode material for lithium-ion secondary batteries according to the embodiment is measured with a BET method using nitrogen ($N_2$) adsorption.

[Olivine Positive Electrode Active Material]

The olivine positive electrode active material is formed of a compound represented by Formula $Li_xA_yD_zPO_4$ (where A represents at least one selected from the group consisting of Co, Mn, Ni, Fe, Cu, and Cr, D represents at least one selected from the group consisting of Mg, Ca, Sr, Ba, Ti, Zn, B, Al, Ga, In, Si, Ge, Sc, Y, and rare earth elements, $0.9<x<1.1$, $0<y\leq1$, $0\leq z<1$, and $0.9<y+z<1.1$).

From the viewpoints of high discharge capacity and high energy density, it is preferable that the positive electrode active material satisfies $0.9<x<1.1$, $0<y\leq1$, $0\leq z<1$, and $0.9<y+z<1.1$ in $Li_xA_yD_zPO_4$.

From the viewpoint that a positive electrode mixture layer that can realize high discharge potential and high safety, Co, Mn, Ni, or Fe is preferable as A, and Mg, Ca, Sr, Ba, Ti, Zn, or Al is preferable as D.

Here, the rare earth elements refer to 15 elements including La, Ce, Pr, Nd, Pm, Sm, Eu, Gd, Tb, Dy, Ho, Er, Tm, Yb, and Lu that are lanthanum elements.

The crystallite diameter of the olivine positive electrode active material is preferably 30 nm or more and 150 nm or less and more preferably 50 nm or more and 120 nm or less. When the crystallite diameter of the olivine positive electrode active material is less than 30 nm, a large amount of carbon is required to sufficiently coat the surface of the positive electrode active material with the pyrolyzed carbon coating. In addition, since a large amount of a binder is required, the amount of the positive electrode active material in the positive electrode decreases, and the battery capacity may decrease. Likewise, the carbon coating may peel off due to an insufficient binding strength. On the other hand, when the crystallite diameter of the olivine positive electrode active material is more than 150 nm, the internal resistance of the positive electrode active material excessively increases, and thus when a battery is formed, the discharge capacity in the high charge-discharge rate may decrease.

The crystallite diameter of the olivine positive electrode active material is calculated from the Scherrer equation using a full width at half maximum of a diffraction peak and a diffraction angle (2θ) of the (020) plane in a powder X-ray diffraction pattern that is measured by X-ray diffraction measurement.

[Carbon Coating]

The carbon coating is a pyrolyzed carbon coating that is obtained by carbonizing an organic compound as a raw material. It is preferable that the carbon source that is a raw material of the carbon coating is derived from an organic compound in which the purity of carbon is 42.00% or higher and 60.00% or lower.

In the positive electrode material for lithium-ion secondary batteries according to the embodiment, as a method of calculating "purity of carbon" in the carbon source that is a raw material of the carbon coating, when plural kinds of organic compounds are used, a method of calculating and adding the amounts of carbon (% by mass) in the mixing amounts of the respective organic compounds based on the mixing amounts (% by mass) of the respective organic compounds and the known purities (%) of carbon and calculating the "purity of carbon" in the carbon source from the following Formula (1) based on the total mixing amount (% by mass) and the total amount of carbon (% by mass of the organic compounds is used.

Purity of Carbon (%)=Total amount of Carbon (% by mass)/Total Mixing Amount (% by mass)×100 (1)

The positive electrode material for lithium-ion secondary batteries according to the embodiment can be produced using the method of producing a positive electrode material for lithium-ion secondary batteries. Therefore, the positive electrode material for lithium-ion secondary batteries can be provided in which the surface of the positive electrode active material is uniformly coated with the pyrolyzed carbon coating and the primary particles of the positive electrode active material do not bind to each other due to agglomeration. Thus, with the positive electrode material for lithium-ion secondary batteries according to the embodiment, a lithium-ion secondary battery can be realized in which the discharge capacity is high and the charge-discharge direct current resistance is low.

[Positive Electrode for Lithium-Ion Secondary Batteries]

The positive electrode for lithium-ion secondary batteries according to the embodiment includes: an electrode current collector; and a positive electrode mixture layer (electrode) that is formed on the electrode current collector, in which the positive electrode mixture layer includes the positive electrode material for lithium-ion secondary batteries according to the embodiment.

That is, in the positive electrode for lithium-ion secondary batteries according to the embodiment, the positive electrode mixture layer is formed on one main surface of the electrode current collector using the positive electrode material for lithium-ion secondary batteries according to the embodiment.

A method of manufacturing the positive electrode for lithium-ion secondary batteries according to the embodiment is not particularly limited as long as the positive electrode mixture layer can be formed on one main surface of the electrode current collector using the positive electrode material for lithium-ion secondary batteries according to the embodiment. Examples of the method of manufacturing the positive electrode for lithium-ion secondary batteries according to the embodiment include the following method.

First, the positive electrode material for lithium-ion secondary batteries according to the embodiment, a binder, a conductive auxiliary agent, and a solvent are mixed with each other to prepare a positive electrode material paste for lithium-ion secondary batteries.

[Binder]

The binder is not particularly limited as long as it is an aqueous binder. Examples of the binder include at least one selected from the group consisting of polyethylene, polypropylene, polyethylene terephthalate, polymethyl methacrylate, a vinyl acetate copolymer, styrene-butadiene latex, acrylic latex, acrylonitrile-butadiene latex, fluorine latex, silicon latex, and the like.

When the total mass of the positive electrode material for lithium-ion secondary batteries according to the embodiment, the binder, and the conductive auxiliary agent is represented by 100% by mass, the content of the binder in the positive electrode material paste for lithium-ion secondary batteries is preferably 1% by mass or more and 10% by mass or less and more preferably 2% by mass or more and 6% by mass or less.

[Conductive Auxiliary Agent]

The conductive auxiliary agent is not particularly limited, and for example, at least one selected from the group acetylene black, Ketjen black, Furnace black, and filamentous carbon such as vapor-grown carbon fiber (VGCF) or carbon nanotube is used.

When the total mass of the positive electrode material for lithium-ion secondary batteries according to the embodiment, the binder, and the conductive auxiliary agent is represented by 100% by mass, the content of the conductive auxiliary agent in the positive electrode material paste for lithium-ion secondary batteries is preferably 1% by mass or more and 15% by mass or less and more preferably 3% by mass or more and 10% by mass or less.

[Solvent]

The solvent may be appropriately added to the positive electrode material paste for lithium-ion secondary batteries including the positive electrode material for lithium-ion secondary batteries according to the embodiment so as to easily coat a coating object such as the electrode current collector with the paste.

The solvent is mainly formed of water and may optionally include an aqueous solvent such as an alcohol, a glycol, or an ether within a range where the characteristics of the positive electrode material for lithium-ion secondary batteries according to the embodiment do not deteriorate.

When the total mass of the positive electrode material for lithium-ion secondary batteries according to the embodiment, the binder, and the solvent is represented by 100 parts by mass, the content of the solvent in the positive electrode material paste for lithium-ion secondary batteries is preferably 60 parts by mass or more and 400 parts by mass or less and more preferably 80 parts by mass or more and 300 parts by mass.

By controlling the content of the solvent to be in the above-described range, the positive electrode material paste for lithium-ion secondary batteries having good electrode formability and good battery characteristics can be obtained.

A method of mixing the positive electrode material for lithium-ion secondary batteries according to the embodiment, the binder, the conductive auxiliary agent, and the solvent with each other is not particularly limited as long as it is a method capable of uniformly mixing the components. For example, a method of using a kneader such as a ball mill, a sand mill, a planetary mixer, a paint shaker, or a homogenizer can be used.

Next, one main surface of the electrode current collector is coated with the positive electrode material paste for lithium-ion secondary batteries to form a coating thereon, and this coated film is dried and compressed. As a result, the positive electrode for lithium-ion secondary batteries in which the positive electrode mixture layer is formed on the main surface of the electrode current collector can be obtained.

The positive electrode for lithium-ion secondary batteries according to the embodiment includes the positive electrode material for lithium-ion secondary batteries according to the embodiment. Therefore, the positive electrode for lithium-ion secondary batteries having no unevenness in composition can be produced.

[Lithium-Ion Secondary Battery]

The lithium-ion secondary battery according to the embodiment includes a positive electrode, a negative electrode, and a non-aqueous electrolyte, in which the positive electrode for lithium-ion secondary batteries according to the embodiment is provided as the positive electrode.

In the lithium-ion secondary battery according to the embodiment, the negative electrode, the non-aqueous electrolyte, the separator, and the like are not particularly limited.

The negative electrode can be formed of, for example, a negative electrode material such as metal Li, a carbon material, a Li alloy, or $Li_4Ti_5O_{12}$.

In addition, a solid electrolyte may be used instead of the non-aqueous electrolyte and the separator.

The non-aqueous electrolyte can be prepared by mixing ethylene carbonate (EC) and ethyl methyl carbonate (EMC) with each other at a volume ratio of 1:1 to obtain a mixed solvent, and dissolving lithium hexafluorophosphate ($LiPF_6$) in the obtained mixed solvent such that the concentration thereof is, for example, 1 mol/dm$^3$.

As the separator, for example, porous propylene can be used.

The lithium-ion secondary battery according to the embodiment includes the positive electrode for lithium-ion secondary batteries according to the embodiment. Therefore, the discharge capacity is high, and the charge-discharge direct current resistance is low.

[Examples]

Hereinafter, the present invention will be described in detail using Examples and Comparative Examples, but is not limited to the following examples.

Production Example 1

[Production of Positive Electrode Active Material ($LiFePO_4$)]

Lithium hydroxide (LiOH) was used as a Li source, ammonium dihydrogen phosphate ($NH_4H_2PO_4$) was used as a P source, and iron (II) sulfate heptahydrate ($FeSO_4.7H_2O$) was used as a Fe source.

Lithium hydroxide, ammonium dihydrogen phosphate, and iron (II) sulfate heptahydrate were mixed with water such that a mass ratio Li:Fe:P=3:1:1 and the total amount thereof was 200 mL.

As a result, a uniform slurry-like mixture was prepared.

Next, this mixture was accommodated in a pressure-resistant airtight container having a volume of 500 mL, and hydrothermal synthesis was performed at 170° C. for 12 hour.

After the reaction, the reaction solution was cooled to room temperature (25° C.), and a precipitated cake reaction product was obtained.

Next, this precipitate (reaction product) was sufficiently cleaned with distilled water, and pure water was added to prevent drying and to maintain the water content at 30%.

As a result, a cake-like material was obtained. A small amount of the cake-like material was collected and was dried in a vacuum state at 70° C. for 2 hours to obtain powder. The powder was analyzed by X-ray diffraction measurement (X-ray diffractometer: RINT 2000, manufactured by Rigaku Corporation). As a result, it was verified that single-phase $LiFePO_4$ was formed.

Production Example 2

[Production of Positive Electrode Active Material ($LiMnPO_4$)]

$Li[Fe_{0.25}Mn_{0.75}]PO_4$ was synthesized using the same method as that of Production Example 1, except that a mixture ($FeSO_4.7H_2O:MnSO_4.H_2O$=25:75 (material mass ratio) of iron (II) sulfate heptahydrate ($FeSO_4.7H_2O$) manganese (II) sulfate monohydrate ($MnSO_4.H_2O$) was used as the Fe source.

Example 1

20 g of $LiFePO_4$ (positive electrode active material) obtained in Production Example 1 and 80 g of water as a dispersion medium were mixed with each other to prepare a mixture, 150 g of zirconia beads having a diameter of 0.1 mm as medium particles were added to the mixture, and the mixture was dispersed using a bead mill.

As a result, a uniform dispersion liquid was prepared. Next, 0.73 g of sucrose as a carbon source was added to the above-described dispersion liquid, and a dispersion liquid was prepared using the same bead mill as described above.

Next, the obtained dispersion liquid was dried and granulated using a spray dryer such that the drying outlet temperature was 60° C.

As a result, a granulated powder was obtained.

Next, a heat treatment was performed on the granulated powder using a rotary kiln at a temperature of 770° C. for 4 hours. As a result, a positive electrode material according to Example 1 that was produced using the granulated body formed of the primary particles of the carbon-coated positive electrode active material was obtained.

Example 2

A positive electrode material according to Example 2 that was produced using the granulated body formed of the primary particles of the carbon-coated positive electrode active material was obtained using the same method as that of Example 1, except that 0.5% of polyvinyl alcohol with respect to the granulated powder was added, stirred, and mixed before the heat treatment using the rotary kiln.

Example 3

A positive electrode material according to Example 3 that was produced using the granulated body formed of the primary particles of the carbon-coated positive electrode active material was obtained using the same method as that of Example 1, except that zirconia beads having a diameter of 0.3 mm was used.

Example 4

A positive electrode material according to Example 4 that was produced using the granulated body formed of the primary particles of the carbon-coated positive electrode active material was obtained using the same method as that of Example 1, except that $Li[Fe_{0.25}Mn_{0.75}]PO_4$ obtained in Production Example 2 was used as the positive electrode active material instead of $LiFePO_4$.

Comparative Example 1

A positive electrode material according to Comparative Example 1 that was produced using the granulated body formed of the primary particles of the carbon-coated positive electrode active material was obtained using the same method as that of Example 1, except that the dispersion liquid was prepared by mixing using a stirring bar instead of zirconia beads.

Comparative Example 2

A positive electrode material according to Comparative Example 2 that was produced using the granulated body formed of the primary particles of the carbon-coated positive electrode active material was obtained using the same method as that of Example 1, except that the granulated powder was crushed with a dry ball mill using zirconia beads having a diameter of 1 mm and a heat treatment was performed thereon.

Comparative Example 3

A positive electrode material according to Comparative Example 3 that was produced using the granulated body formed of the primary particles of the carbon-coated positive electrode active material was obtained using the same method as that of Example 1, except that the granulated powder was charged into a carbon capsule and a heat treatment was performed on the carbon capsule using a tube furnace.

[Preparation of Lithium Ion Battery]

The positive electrode materials obtained in each of Examples 1 to 4 and Comparative Examples 1 to 3, polyvinylidene fluoride (PVdF) as a binder, and acetylene black (AB) as a conductive auxiliary agent were added to N-methyl-2-pyrrolidinone (NMP) such that a mass ratio (positive electrode material:AB:PVdF) thereof in the paste was 90:5:5, and the components were mixed with each other to prepare a positive electrode material paste.

Next, this positive electrode material paste was applied to a surface of aluminum foil (electrode current collector) having a thickness of 30 μm to form a coating film, and this coating film was dried to form a positive electrode mixture layer on the surface of the aluminum foil. Next, the positive electrode mixture layer was pressed such that a predetermined density was obtained. As a result, an electrode plate for a positive electrode was obtained.

Using a forming machine, the obtained electrode plate was punched into a plate shape including a positive electrode mixture layer having a 3 cm (length)×3 cm (width) rectangular shape (electrode area: 9 $cm^2$) and a space for a tab.

Next, an electrode tab was welded to the space for a tap of the electrode plate to prepare a test electrode (positive electrode).

A coated electrode as a negative electrode was arranged on the test electrode with a separator formed of a porous polypropylene membrane interposed therebetween. As a result, a member for a battery was obtained. The coated electrode was formed by applying a mixture to the separator, the mixture being obtained by mixing natural graphite, acetylene black (AB), styrene-butadiene rubber (SBR), and carboxymethyl cellulose (CMC) such that a mass ratio natural graphite:AB:SBR:CMC thereof was 92:4:3:1.

The prepared positive electrode and the prepared negative electrode were arranged to face each other with a separator formed of porous polypropylene having a thickness of 20 μm interposed therebetween, the laminate was dipped in 0.5 mL of a 1 mol/L lithium hexafluorophosphate (LiPF6) solution as a non-aqueous electrolytic solution, and the laminate film was sealed to prepare a lithium-ion secondary battery.

In order to obtain the LiPF6 solution, ethylene carbonate and ethyl methyl carbonate were mixed with each other at a volume ratio of 1:1, and 2% vinylene carbonate as an additive was added thereto.

[Evaluation of Positive Electrode Material]

The positive electrode material obtained in each of Examples 1 to 4 and Comparative Examples 1 to 3 and components included in the positive electrode material were evaluated. Evaluation methods are as follows. The results are shown in Table 1.

(1) Span Value of Particle Diameter Distribution of Positive Electrode Active Material Included in Dispersion Liquid Using a particle diameter distribution analyzer (trade name: LA-920, manufactured by Horiba Ltd.), the particle diameter distribution of the positive electrode active material in the dispersion liquid including the positive electrode active material and water was measured with a method according to JIS Z 8825 "Particle Size Analysis—Laser Diffraction Methods—".

Using the measurement result of the particle diameter distribution, the span value of the particle diameter distribution of the positive electrode active material in the dispersion liquid was calculated.

Span Value=$(D90-D10)/D50$ (2) Crystallite Diameter of Positive Electrode Active Material The crystallite diameter of the positive electrode active material was calculated from the Scherrer equation using a full width at half maximum of a diffraction peak and a diffraction angle (2θ) of the (020) plane in a powder X-ray diffraction pattern that is measured by X-ray diffraction measurement (X-ray diffractometer: RINT 2000 (trade name), manufactured by Rigaku Corporation).

(3) Sphericity of Granulated Body

Granulated bodies having undergone the heat treatment were observed using a scanning electron microscope, and the average value of minor axis diameter/major axis diameter of 100 granulated bodies was obtained as the sphericity of the granulated body.

[Evaluation of Positive Electrode and Lithium-Ion Secondary Battery]

Using the lithium-ion secondary battery obtained in each of Examples 1 to 4 and Comparative Examples 1 to 3, the discharge capacity and the charge-discharge direct current resistance (DCR) were measured. Evaluation methods are as follows. The results are shown in Table 1.

(1) Discharge Capacity

At an environmental temperature of 25° C., the cut-off voltage was set as 2.5 V-3.7 V (vs carbon negative electrode) in the batteries other than Example 3, and the cut-off voltage was set as 2.5 V-4.2 V (vs carbon negative electrode) in the batteries according to Example 3, the charge current was set as 1 C, the discharge current was set as 3 C, and the discharge capacity of the lithium-ion secondary battery was measured by constant-current charging and discharging.

(2) Charge-Discharge Direct Current Resistance (DCR)

The lithium-ion secondary battery was charged at a current of 0.1 C at an environmental temperature of 0° C. for 5 hours and the charge depth was adjusted (stage of charge (SOC) 50%). Regarding the battery adjusted to SOC 50%, "charging at 1 C for 10 seconds-rest for 10 minutes→discharging at 1 C for 10 seconds-rest for 10 minutes" as a first cycle, "charging at 3 C for 10 seconds-rest for 10 minutes→discharging at 3 C for 10 seconds-rest for 10 minutes" as a second cycle, "charging at 5 C for 10 seconds-rest for 10 minutes→discharging at 5 C for 10 seconds-rest for 10 minutes" as a third cycle, and "charging at 10 C for 10 seconds-rest for 10 minutes→discharging at 10 C for 10 seconds-rest for 10 minutes" as a fourth cycle were performed in this order. At this time, the voltage was measured 10 seconds after every charging and discharging. An approximation straight line was plotted on a graph in which the horizontal axis represents each current value and the vertical axis represents the voltage after 10 seconds. Respective slopes of the approximation straight lines were obtained as a direct current resistance during charging (charge DCR) and a direct current resistance during discharging (discharge DCR).

TABLE 1

| | Calcination Device | Span Value in Particle Diameter Distribution of Positive Electrode Active Material | Crystallite Diameter [nm] | Sphericity of Granulated Body | 3 C Discharge Capacity [mAh/g] | Charge Direct Current Resistance [Ω] | Discharge Direct Current Resistance [Ω] |
|---|---|---|---|---|---|---|---|
| Example1 | Rotary Kiln | 0.70 | 85 | 0.90 | 138 | 2.5 | 1.9 |
| Example2 | Rotary Kiln | 0.70 | 82 | 0.93 | 135 | 2.6 | 2.0 |
| Example3 | Rotary Kiln | 2.99 | 92 | 0.85 | 132 | 2.8 | 2.2 |
| Example4 | Rotary Kiln | 0.58 | 82 | 0.82 | 130 | 2.9 | 2.5 |
| Comparative Example1 | Rotary Kiln | 26.63 | 102 | 0.88 | 122 | 2.9 | 2.5 |
| Comparative Example2 | Rotary Kiln | 0.70 | 101 | 0.65 | 125 | 2.9 | 2.6 |
| Comparative Example3 | Tube Furnace (Capsule Calcination) | 0.70 | 89 | 0.95 | 120 | 3.0 | 2.7 |

The results of Table 1 are as follows. In each of Examples 1 to 4, the rotary kiln was used as the calcination device, the span value of the particle diameter distribution of the positive electrode active material was 0.58 to 2.99, and the sphericity of the granulated body was 0.82 to 0.93. Therefore, the 3 C discharge capacity was 130 mAh/g or higher, the charge direct current resistance was 2.9Ω or lower, and the discharge direct current resistance was 2.5Ω or lower.

On the other hand, in Comparative Example 1, the span value of the particle diameter distribution of the positive electrode active material was 26.63. Therefore, the 3 C discharge capacity was 122 mAh/g or higher, the charge direct current resistance was 2.9Ω, and the discharge direct current resistance was 2.5Ω.

In Comparative Example 2, the sphericity of the granulated body was 0.65. Therefore, the 3 C discharge capacity was 125 mAh/g or higher, the charge direct current resistance was 2.9Ω, and the discharge direct current resistance was 2.6Ω.

In Comparative Example 3, the tube furnace was used as the calcination device. Therefore, the 3 C discharge capacity was 120 mAh/g or higher, the charge direct current resistance was 3.0Ω, and the discharge direct current resistance was 2.7Ω.

That is, when Examples 1 to 4 were compared to Comparative Examples 1 to 3, it was found that the discharge capacity was high and the charge-discharge direct current resistance was low.

INDUSTRIAL APPLICABILITY

The positive electrode material for lithium-ion secondary batteries according to the present invention is produced using the method of producing a positive electrode material for lithium-ion secondary batteries, and includes a positive electrode active material; and a pyrolyzed carbon coating that coats a surface of the positive electrode active material, in which a sphericity is 0.8 or higher. Therefore, the positive electrode for lithium-ion secondary batteries that is produced using the positive electrode material for lithium-ion secondary batteries has excellent electron conductivity. Accordingly, in the lithium-ion secondary battery including the positive electrode for lithium-ion secondary batteries, the charge-discharge direct current resistance was low, and the discharge capacity was high. Therefore, the lithium-ion secondary battery is applicable to the next-generation secondary battery in which high voltage, high energy density, high load characteristics, and high-speed charge and discharge characteristics are expected. In the case of the next-generation secondary battery, the effects are significant.

As described above, the present invention can provide a method of producing a positive electrode material for lithium-ion secondary batteries, a positive electrode material for lithium-ion secondary batteries, a positive electrode for lithium-ion secondary batteries, and a lithium-ion secondary battery, in which adherence of a positive electrode active material to an inner wall surface of a rotary kiln, sintering between primary particles, fine powder formation, and the like can be prevented.

The invention claimed is:

1. A method of producing a positive electrode material for lithium-ion secondary batteries which includes a pyrolyzed carbon coating, comprising:
   a step of performing a dispersion treatment of a first mixture which includes a dispersion medium and primary particles, which consist of a positive electrode active material, to generate a dispersion wherein a span value of a particle diameter distribution of the primary particles is 0.5 or more and 3.0 or less;
   a step of mixing the dispersion and an organic compound which is a carbon source that forms a pyrolyzed carbon coating to form a second mixture,
   a step of drying the second mixture using a spray dryer to obtain a granulated body having a sphericity of 0.8 or higher, which includes the organic compound and the primary particles; and
   a heat treatment step of calcinating the granulated body using a rotary kiln to thermally decompose the organic compound and form a pyrolyzed carbon coating, and obtaining the calcinated granulated body as the positive electrode material for lithium-ion secondary batteries which includes the pyrolyzed carbon coating,
   wherein the calcinated granulated body has a sphericity of 0.8 or more,
   and
   the span value is obtained by a following expression using a particle diameter D90 which is obtained at a cumulative volume percent of 90 vol %, a particle diameter D50 which is obtained at a cumulative volume percent of 50 vol %, and a particle diameter D10 which is obtained at a cumulative volume percent of 10 vol %, wherein the diameters are obtained from a volume particle diameter distribution of the primary particles by evaluating the first mixture, span value=$(D90-D10)/D50$.

2. The method of producing the positive electrode material for lithium-ion secondary batteries according to claim 1, wherein the positive electrode material for lithium-ion secondary batteries includes an olivine type positive electrode active material.

3. The method of producing the positive electrode material for lithium-ion secondary batteries according to claim 2, wherein
   the olivine type positive electrode active material has a crystallite diameter of 30 to 150 nm, and is represented by Formula $Li_xA_yD_zPO_4$ (where A represents at least one selected from the group consisting of Co, Mn, Ni, Fe, Cu, and Cr, D represents at least one selected from the group consisting of Mg, Ca, Sr, Ba, Ti, Zn, B, Al, Ga, In, Si, Ge, Sc, Y, and rare earth elements, $0.9<x<1.1$, $0<y\le1$, $0\le z<1$, and $0.9<y+z<1.1$).

4. The method of producing the positive electrode material for lithium-ion secondary batteries according to claim 1, wherein the positive electrode active material is produced by a hydrothermal synthesis method.

5. The method of producing the positive electrode material for lithium-ion secondary batteries according to claim 1, wherein, in the heat treatment step,
   the granulated body is fed into the kiln from an upper portion of the kiln,
   the fed granulated body is calcinated while moving from the upper portion to a lower portion of the kiln and being stirred due to the rotation of the kiln,
   a positive pressure gas, which has a pressure which is 0.01 kPa to 1 kPa higher than atmospheric pressure, is supplied to the kiln,
   the positive pressure gas is supplied and exhausted so as to flow in a direction opposite to the flow of the granulated body,
   the positive pressure gas is at least one selected from the group consisting of nitrogen, carbon dioxide, hydrogen, helium, neon, argon, krypton, xenon, and radon,
   a calcination temperature of the granulated body in the kiln is 400 to 1000° C.,
   calcination time of the granulated body is 0.5 to 6 hours, and
   an oxygen concentration in the kiln main body is 200 ppm or lower.

6. The method of producing the positive electrode material for lithium-ion secondary batteries according to claim 1, wherein
   the kiln is arranged in an inclined state.

7. The method of producing the positive electrode material for lithium-ion secondary batteries according to claim 1, wherein
   a carbon content in the organic compound is 2 parts by mass or more and 20 parts by mass or less with respect to 100 parts by mass of the positive electrode active material.

8. The method of producing the positive electrode material for lithium-ion secondary batteries according to claim 1, wherein
   an average particle diameter of the primary particles in the calcinated granulated body is 30 nm or more and 500 nm or less, and
   an average particle diameter of the calcinated granulated body is 0.5 μm or more and 60 μm or less, and
   a carbon-coating coverage of the primary particles in the calcinated granulated body is 80% or more.

* * * * *